G. R. WADSWORTH.
DASH SET FOR MOTOR VEHICLES.
APPLICATION FILED NOV. 8, 1911.

1,100,999.

Patented June 23, 1914.

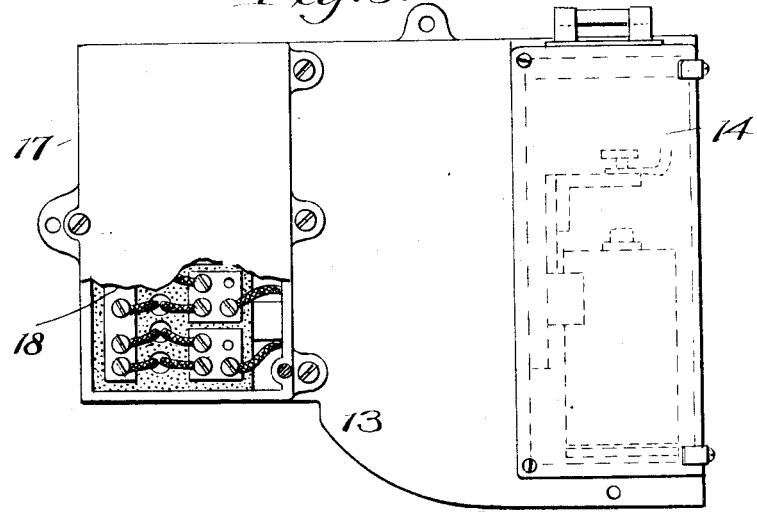
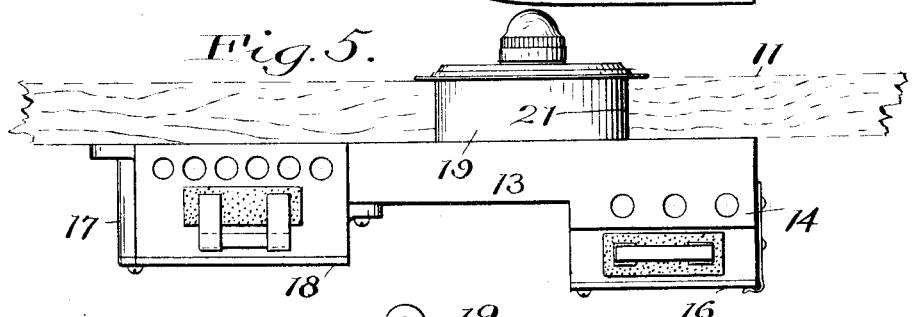
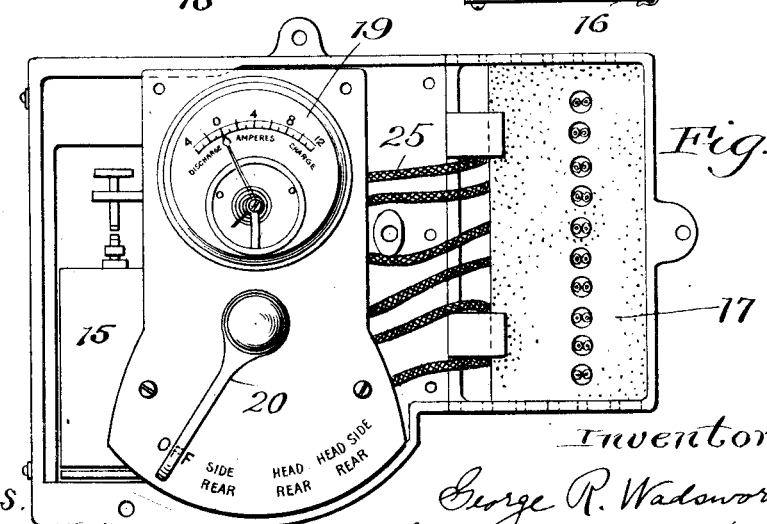

UNITED STATES PATENT OFFICE.

GEORGE R. WADSWORTH, OF CLEVELAND, OHIO, ASSIGNOR TO THE PEERLESS MOTOR CAR COMPANY, OF CLEVELAND, OHIO, A CORPORATION OF OHIO.

DASH SET FOR MOTOR-VEHICLES.

1,100,990.

Specification of Letters Patent.   Patented June 23, 1914.

Application filed November 8, 1911. Serial No. 659,098.

*To all whom it may concern:*

Be it known that I, GEORGE R. WADSWORTH, a citizen of the United States, residing at Cleveland, in the county of Cuyahoga and State of Ohio, have invented a certain new and useful Improvement in Dash Sets for Motor-Vehicles, of which the following is a full, clear, and exact description.

This invention relates to motor vehicles provided with the so-called dynamo lighting system, which includes a dynamo and a storage battery, the former supplying current to the lamps and charging the battery, when its voltage is sufficient for that purpose, and the battery furnishing the current for the lamps when the machine is stationary or when the voltage of the dynamo at the speed at which it may be driven is not sufficient for charging and lighting purposes, at which time, the dynamo is cut out of circuit by means of an automatic cutout or switch. A lighting system of this type is well known, and further illustration or description of its operation is thought to be unnecessary for the purposes of the present application. For the successful operation of a lighting system of this type, I have found it desirable to employ in addition to the automatic cutout, certain auxiliary apparatus, including one or more electrical measuring instruments, a junction box, and a hand switch by which the lamps may be disconnected from the system, or may be connected to the same in various combinations. It is desirable also that these various parts be mounted on the dash of the vehicle.

My invention relates to the arrangement and manner of supporting on the dash, the auxiliary apparatus, above referred to, and has for one of its objects to so arrange and support these devices, that they may all be mounted on the dash in the most convenient position for use, and to arrange them in the form of a unit which I term the "dash-set" to facilitate the handling, installation, or removal of the same.

Further, the invention aims to so arrange and support these parts, that a minimum amount of wiring is required, and so as to simplify the arrangement of the wiring which may be compactly arranged, and will be out of the way, and will not interfere with any other parts of the machine, nor obstruct access to the same.

The above and other objects are attained by my invention which may be briefly summarized as consisting in certain novel details of construction and combinations and arrangements of parts which will be described in the specification and set forth in the appended claims.

Figure 1:
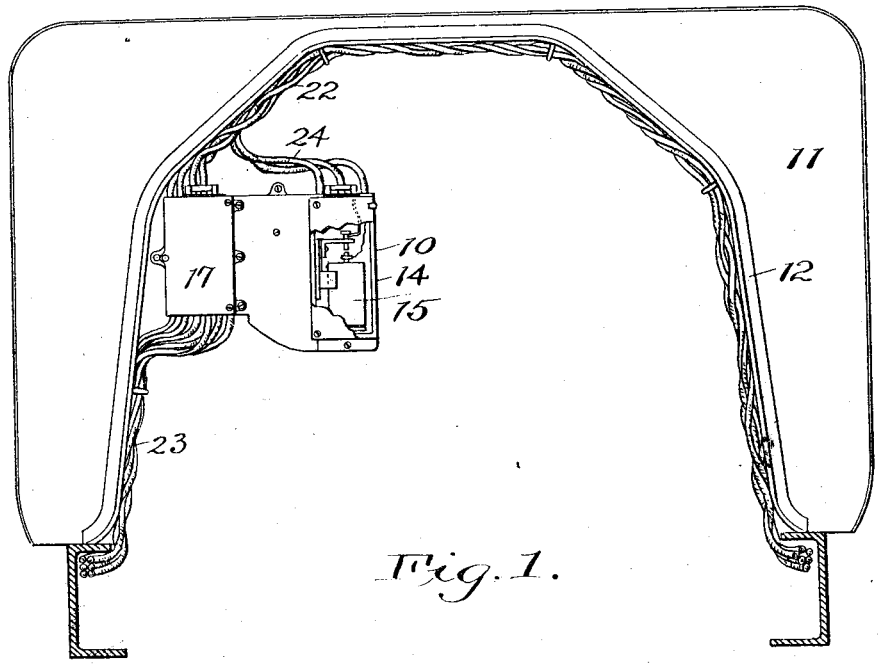
Figure 2:
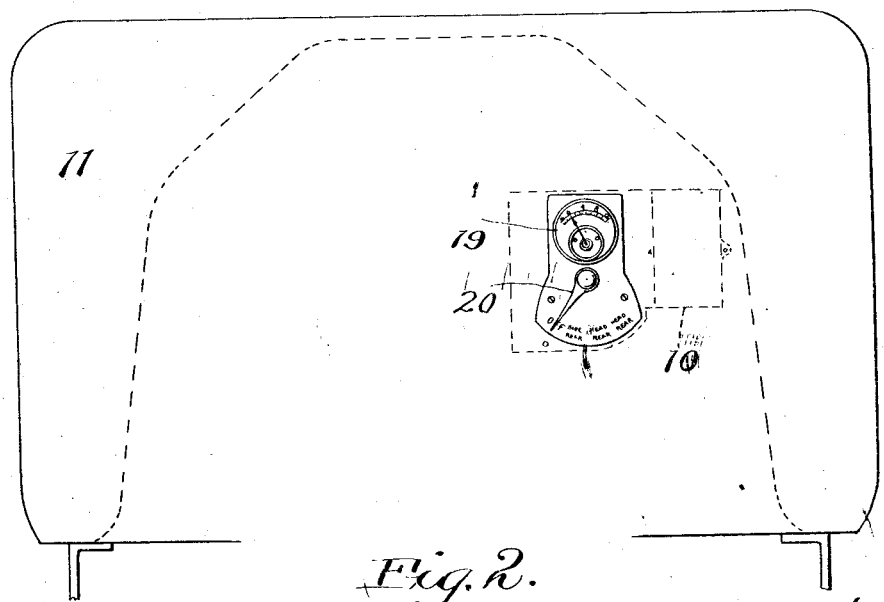

In the drawings, Figure 1 is a view looking toward the front side of the dash of a vehicle equipped with my improved dashset which may be employed in connection with the lighting system above referred to, the hood being removed, the frame being shown in section, and parts not essential to my invention, being omitted; Fig. 2 is a rear view, or a view of the dash with the dash-set applied thereto, as these parts appear from the driver's seat. Fig. 3 is an enlarged front view of the dash-set removed from the dash, parts being broken away; Fig. 4 is a similar view of the dash-set looking toward the opposite side thereof; and Fig. 5 is a sectional view, taken through the dash, with the set in position thereon, the latter being shown in plan.

In order that the cut-out, the hand switch for controlling the lamps in various combinations, the electrical measuring instrument or instruments, and junction box, may be accommodated on the dash, which would be impossible or difficult of attainment if said parts were separated and independently mounted, and for the accomplishment of the other objects mentioned above, I arrange these parts into the compact, unitary, structure which I term the dash-set designated as a whole by the reference character 10, this dash-set being mounted on the front face of the dash 11, and being normally covered by the hood, the ledge 12 of which is shown in Fig. 1. The dash-set 10 includes a single or unitary support or base 13, which may or may not consist of a single casting, but if it is composed of two or more parts, such parts will be fastened together so as to constitute a unitary support. At one end of this support, there is provided a chamber 14 which incloses the automatic cut-out 15, which connects into the circuit the dynamo when its voltage is built up to the predetermined point, or cuts the dynamo out of circuit so that the battery may serve as the source of current for the lamps, and if desired, also the ignition coil, when the voltage of the dynamo is below the predetermined value. This chamber is closed at its rear side by the front face of the dash, and its forward side is normally closed by a removable cover 16. This cutout being automatic in its operation, does not require accessibility from the driver's seat, and is therefore not visible from the rear side of the dash, but access can be had to it by reason of the removable cover 14 at the front side of the dash, when the hood is removed. At the opposite end of the support is the junction box 17, which is likewise not visible from the rear side of the dash, but is accessible from the front side. The rear side of the junction box is closed by the dash, as is seen in Fig. 5, and the front side is normally closed by a removable cover 18.

In addition to said parts, the dash-set includes a measuring instrument 19, preferably an ammeter, which may be connected so as to indicate the current amperage either during the charging or discharging of the battery, and the hand switch 20. Both the ammeter and hand switch are secured to the rear side of the support, as clearly shown in the drawings, and project through an opening 21 in the dash shaped to accommodate these two parts, so that they are respectively visible and accessible for manipulation from the rear side of the dash or from the driver's seat.

In the junction box are made all the necessary electrical connections for the lamps, dynamo, battery, hand switch, ammeter, cutout and other apparatus requiring current, such as the ignition coil, the conductors extending outwardly from the top and bottom of the junction box, as indicated at 22 and 23, in Fig. 1. The arrangement of the dash-set is such that all the conductors which extend from the junction box along the front of the dash, may be carried to the right or left side of the machine in compact groups, beneath or along the hood or bonnet ledge 12, and are therefore out of the way and incapable of interfering with other parts. The connections between the dynamo and the cut-out are shown at 24, as entering the top of the cut-out chamber. The connections of the cut-out, the measuring instrument, and the hand switch, with the junction box, can by reason of the compact arrangement of these parts be accomplished by short conductors 25, extending to the junction box along the rear face of the support 10 of the dash-set.

As indicated in Fig. 4, the hand switch enables the driver to cut out the lamps or to connect them to the lighting system, in various combinations, three combinations being illustrated in Fig. 4. Thus, by this arrangement, not only can these auxiliary parts all be accommodated on the dash which is the most desired location for numerous reasons, but as they are all arranged in a compact unit, they can conveniently be handled, shipped, installed or removed if necessity demands, with little if any trouble. Furthermore, by arranging these parts in a dash-set of the character described, with the instrument and hand switch accessible from the rear side of the dash, and the other parts accessible from the front side, I have an arrangement most desirable for use, and an arrangement which requires a minimum amount of wiring, and does away with the necessity for carrying the conductors back and forth over all parts of the dash, and at the same time permits the various conductors to be compactly arranged and accommodated in a most desirable and effective manner.

Having thus described my invention, what I claim is:

1. In combination in a motor vehicle having a dynamo lighting system, a dash provided with a bonnet ledge and with an opening near the bonnet ledge, a dash set comprising a unitary supporting member secured to the forward side of the dash and provided with circuit controlling devices, part of which project through said opening so as to be accessible, and visible from the rear of the dash, and part being accessible from the front of the dash.

2. In combination in a motor vehicle having a dynamo lighting system, a dash, a dash-set comprising a unitary supporting member secured to the front side of the dash and provided with a junction box for electric connections with parts of the system, and an automatic cutout for the dynamo, both the junction box and cutout being accessible from the front side of the dash, and said supporting member having an electrical measuring instrument, and a hand switch for connecting the lighting system to various lamps, both the instrument and switch projecting rearwardly through the dash and being respectively visible and accessible from the rear side thereof.

In testimony whereof, I hereunto affix my signature in the presence of two witnesses.

GEORGE R. WADSWORTH.

Witnesses:
H. R. SULLIVAN,
A. F. KWIS.